Nov. 3, 1936.  E. L. FRIEDLEIN  2,059,517
TRANSMISSION
Filed Aug. 19, 1933
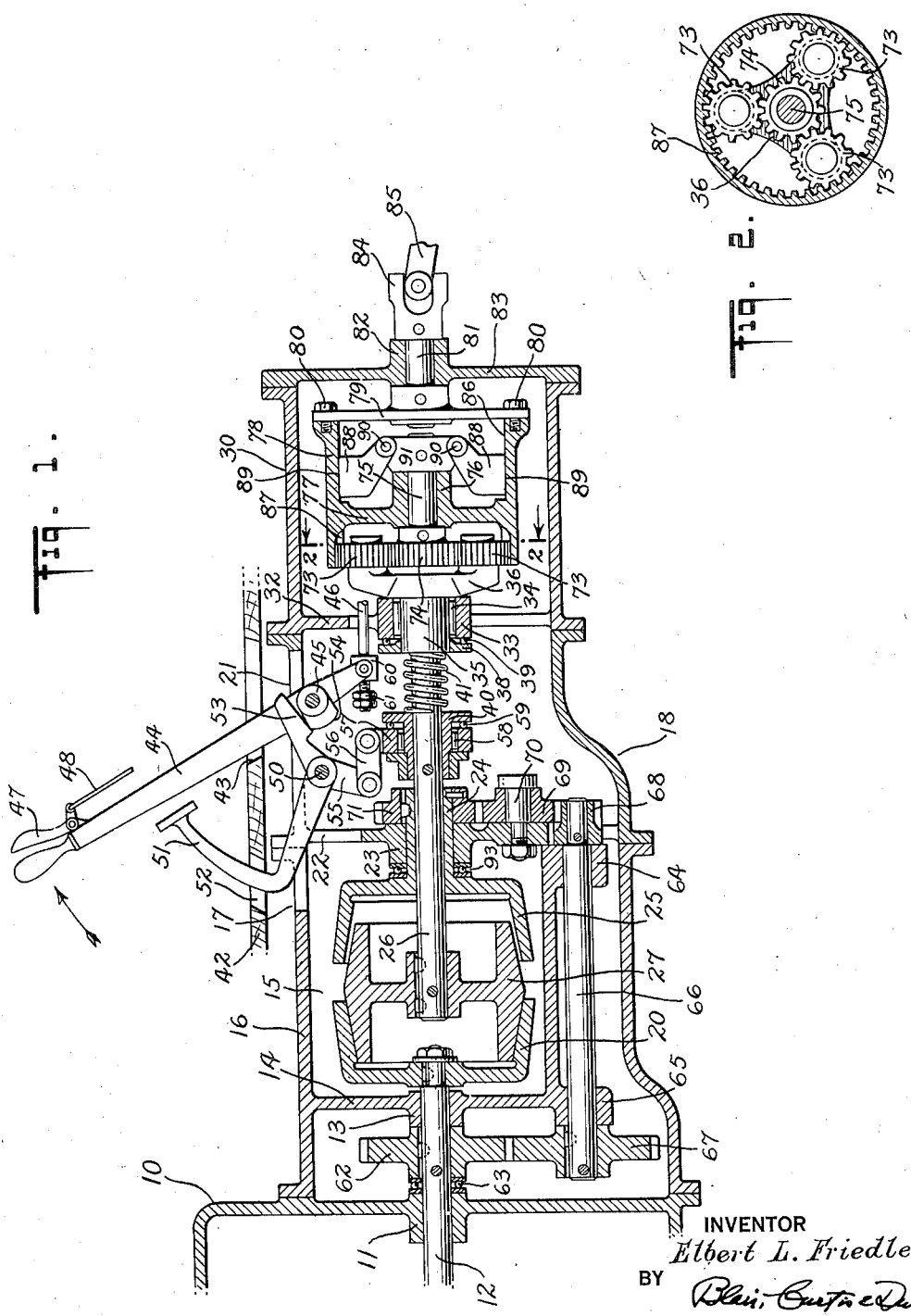
INVENTOR
Elbert L. Friedlein
BY
ATTORNEYS Patented Nov. 3, 1936

2,059,517

UNITED STATES PATENT OFFICE 2,059,517

TRANSMISSION

Elbert L. Friedlein, Baltimore, Md., assignor of one-third to John C. Blair, New York, N. Y., and George Crompton, Jr., Flushing, N. Y.

Application August 19, 1933, Serial No. 685,822

5 Claims. (Cl. 74—260)

The invention relates to transmissions particularly of the type in which the gear ratio is automatically changed under varying conditions of operation, and with regard to its more specific features to automotive transmissions.

One object of the invention is to provide a transmission which will deliver power at an almost infinite number of different ratios of input R. P. M. to output R. P. M. Another object of the invention is to provide a transmission which automatically changes the ratio of input R. P. M. to output R. P. M. in response to a function of the driving torque or load or both. Another object of the invention is to provide a simplified transmission adapted particularly for automobiles. Another object of the invention is to provide a transmission adapted for a wide variety of uses, such as in connection with electric locomotives, marine installations, Diesel locomotives, aircraft and the like. Another object of the invention is to provide a complete transmission for automotive vehicles having a simplified control. Other objects of the invention are to permit the elimination of manual shifting of gears, to increase safety, comfort and convenience in the use and operation of motor cars. Other objects will be in part obvious or in part pointed out hereinafter.

The invention accordingly consists in the features of construction, combinations of elements and arrangement of parts as will be exemplified in the structure to be hereinafter described, and the scope of the application of which will be indicated in the following claims.

In the accompanying drawing, in which is shown one of various possible embodiments of the mechanical features of this invention, Figure 1 is a vertical sectional view of one embodiment of my transmission shown as an automotive transmission;

Figure 2 is a cross-sectional view taken on the line 2—2 of Figure 1.

Similar reference characters refer to similar parts throughout the several views of the drawing.

Referring first to the left hand side of Figure 1, the engine or flywheel casing of an automobile is indicated by the numeral 10. Supported by the casing 10 is a journal 11 which journals an engine or power shaft 12. The shaft 12 passes through and is supported by another journal 13 formed in an end wall 14 of a clutch box 15 whose upper wall 16 is shown as part of the forward section 17 of the entire transmission casing 18.

Fastened to the rear end (these terms and others of like nature are used for convenience and are readily understandable when the transmission is visualized as incorporated in an automobile) of the power shaft 12 is a clutch member 20 which is herein shown as the outer member of a cone clutch.

Fastened to the forward section 17 of the transmission casing 18 is an intermediate section 21 thereof. This intermediate section 21 has a forward end wall 22 which is also the rear end wall of the section 17, and in this end wall 22 is formed a journal 23 which is in axial alignment with the journals 11 and 13. Journaled in journal 23 is a sleeve 24 projecting rearwardly from another outer cone clutch member 25 which is located in the clutch box 15. The sleeve 24 journals a shaft 26 in axial alignment with the power shaft 12. Located between the outer clutch members 20 and 25 is an inner cone clutch member 27 having a pair of conical surfaces respectively formed to tightly engage the inner surfaces of the clutch members 20 and 25 but never both of them. This inner cone clutch member is fastened to the shaft 26.

Referring now to the right hand side of Figure 1, the transmission casing includes a rear section 30 which is fastened to the intermediate section 21, and at the front of the rear section 30 and supported thereby is a recessed wall 32 supporting a journal portion 33. In the journal portion 33 are rollers 34 constituting a roller bearing for the journaling of the central axial part 35 of a multi-armed spider 36. The part 35 has a splined bore which receives the keyed end portion of the shaft 26, so that the spider 36 will rotate with the shaft 26 permitting, however, a limited amount of axial movement between them.

Fastened to the forward end of the part 35 is a disc 38 forming one race of a ball bearing 39 the other race of which is the end wall of the journal portion 33, and the bearing 39 is a thrust bearing. Fastened to the shaft 26 in the intermediate section 21 is a collar 40. On the shaft 26 and between the disc 38 and the collar 40 is a fairly heavy coil spring 41 which thrusts the shaft 26 and therefore the clutch member 27 forwardly to engage the clutch member 27 with the clutch member 20, thus establishing a direct connection between the power shaft 12 and the multi-armed spider 36. Under these conditions the spider 36 will be revolved in the same direction as and at the same speed as the power shaft 12.

The transmission provides means for transmitting power in either angular direction, and also means for disconnecting the power shaft from the driven shaft. This is effected through the clutch members 20, 25 and 27 and the gearing and control mechanism now to be described. Referring to the upper part of Figure 1, the floor board of an automotive vehicle is represented by numeral 42, this floor board having an opening 43 through which extends a brake lever 44 mounted on a stud or the like 45 that is supported by the intermediate section 21. The brake lever 44 is connected to a brake rod 46 whose other end is connected to the usual brake bands not shown. The brake lever 44 preferably has the usual ratchet and pawl arrangement for releasably holding it in any desired position, the pawl of which may be lifted by the grip lever 47 to which is connected the pawl lift rod 48.

Extending through the intermediate section 21 and suitably journaled thereby is a shaft 50. To the shaft 50 is fastened a pedal 51, the pedal being preferably outside the transmission casing 18 and extending through an opening 52 in the floor board 42. Likewise fastened to the shaft 50 outside the transmission casing 18 is an arm 53 whose end is in position for engagement by a cam 54 fastened to the brake lever 44. Inside the intermediate section 21 of the transmission casing 18 and fastened to the pedal shaft 50 is an arm 55 which is connected by means of a link 56 to an outer collar 57 which is received by the collar 40 there being roller bearings 58 and ball thrust bearings 59 interposed between these collars. Downward movement of the pedal 51 causes rearward movement of the shaft 26 which as heretofore noted is urged forwardly by the spring 41.

When the pedal 51 is moved downwardly to an intermediate position the double inner cone clutch member 27 is in intermediate position and out of engagement with each of the clutch members 20 and 25, and the transmission is in idle or neutral position. The pedal member 51 may be held in such intermediate or neutral position by applying the brake to the vehicle, as movement of the brake lever 44 in the direction of the arrow, Figure 1, causes the cam 54 to move the arm 53 upwardly thus retaining the parts in the neutral position of the clutch. Furthermore, the clutch is positively disengaged merely by applying the brakes, through the connections shown, including the cam 54 and arm 53. Movement of the pedal 51 to its lowermost position causes sufficient rearward movement of the shaft 26 to carry the inner clutch member 27 into engagement with the rear outer clutch member 25, establishing a driving connection between them, and establishing a driving connection between the power shaft 12 and the shaft 26 through the gearing about to be described. It is noted that the driver of the vehicle holds the clutch members 25 and 27 together by the pressure of his foot, and when the foot pressure is released they automatically spring out of engagement. It is also noted that the brake connections should preferably be so adjusted that initial movement of the brake lever 44 will serve merely to move the clutch to neutral position, thus permitting what amounts to free wheeling of the vehicle. In Figure 1 the connection between the brake lever 44 and the brake rod 46 is shown by way of a sliding block 60 and adjustment nuts 61 partly to permit lost motion so that the lever 44 may operate as a clutch release lever before it acts to apply the brakes.

Considering now the specific portion of the transmission which connects the power shaft 12 to the rear outer clutch member 25 for reverse drive, it is first noted that this is a constant mesh transmission, but if desired gear shifting means could be incorporated into it. As disclosed, the shaft 12 has fastened thereto a gear 62 located in the forward section 17 but outside of the clutch box 15. Between the gear 62 and the journal 11 is a ball thrust bearing 63 which takes the thrust against the forward clutch member 20 due to the pressure of the spring 41.

Referring now to the lower part of Figure 1, in the forward section 17 of the transmission casing 18 and journaled by a pair of journals 64 and 65 formed on the bottom of the clutch box 15 is a shaft 66. Fastened to the front of the shaft 66 is a gear 67 which meshes with the gear 62. Fastened to the rear of the shaft 66 is a gear 68 which meshes with a gear 69 mounted on a stud 70 projecting from the wall 22. The gear 69 meshes with a gear 71 which is fastened to the sleeve 24 of the outer cone clutch member 25. The gears 68, 69 and 71 are all located in the intermediate section 21 so that they may be kept well greased without any of the grease finding its way into the clutch box 15. Likewise it is noted that the gears 62 and 67 are located in the forward section 17 outside of the clutch box for the same reason.

The gearing just described establishes a constant drive between the power shaft 12 and the rear outer clutch member 25 to revolve the latter in a direction opposite to that of the former and, in the particular embodiment shown, at a reduced rate of speed, for reverse drive of the vehicle whenever the pedal 51 is held in depressed position.

Referring now to the right hand side of Figure 1 in connection with Figure 2, in the rear section 30 of the transmission casing 18 is located the automatic driving ratio change, one embodiment of which is now to be described. The multi-armed spider 36 (having desirably three arms as shown in Figure 2) has rotatably mounted on the several arms thereof gears 73, one on each arm, whose axes are parallel to the axes of the shaft 26. These gears 73 are of the same diameter, number of teeth and pitch and constitute planet gears meshing with a central sun gear 74 fastened to the front end of a short shaft 75 which is journaled in a journal 76 supported by a web 77 extending across a hollow cylindrical member 78. The hollow cylindrical member 78 is fastened to an end plate 79 by means of bolts 80, and this end plate 79 is fastened to a shaft 81 which is received in a journal 82 provided in the rear end wall 83 of the rear section 30 of the transmission casing 18, the shaft 81 being in axial alignment with the shafts 75 and 26. Outside of the transmission casing 18 and connected to the end of the shaft 81 is a universal joint 84 connected to the propeller shaft 85 of an automobile, for example, and thus universal joint 84 and shaft 85 represent the driven element of the transmission and revolve in unison with the hollow cylindrical member 78 and the end plate 79.

The web 77 divides the hollow cylindrical member 78 into two sections, the rear section of which has an internal cylindrical drum portion 86, and the front portion of which has internal gear teeth 87 in constant mesh with the teeth of the planet gears 73. In the rear part of the hollow cylindrical member 78 are located a plurality (in this embodiment 2) of centrifugal shoes 88 which have partial cylindrical surfaces 89 in engagement with the internal drum portion 86. The shoes 88 are mounted on pins 90 secured to a bracket 91 which is fastened to the rear of the short shaft 75. The pins 90 are located to one side of the plane perpendicular to the axis of the member 78 which contains the center of masses of the shoes 88, so that the centrifugal force generated by the revolution of the shoes 88 generates a force tending to move the shoes outwardly. Thus the surfaces 89 of the shoes are, when the transmission is in operation, forced against the internal drum 86.

The action of the automatic change gear ratio mechanism in the rear section 30 is as follows: Whenever the pressure of the shoes 88 against the drum portion 86 due to centrifugal force is greater than the effective load on the hollow cylindrical member 78 due to the load on the driven shaft 85, the sun gear 74 is constrained to revolve at the same speed as the hollow cylindrical member 78 and accordingly the planet gears 73 have no diurnal motion and the transmission is a direct drive transmission. The other extreme of the many operating conditions of the automatic change gear ratio transmission occurs at starting of the vehicle or whenever the load on the driven shaft 85 is to be construed as equivalent to an infinite load. Under these conditions, the hollow cylindrical member 78 does not rotate, and the planet gears 73 travel in the internal gear teeth 87 as on a geared track, causing diurnal motion of the planet gears 73 and rotation of the sun gear 74 in a direction opposite to the diurnal rotation of the planet gears 73 and the same as the orbital rotation of the planet gears 73 which is the same as the direction of rotation of the spider 36. Under these conditions the shoes 88 are revolved creating a friction between the internal cylindrical drum portion 86 and said shoes, which causes resistance to turning of the sun gear that in turn transmits a rotational force to the internal gear teeth 87, there being a couple thus exerted against the hollow cylindrical member 78 on both the forward and the rear parts thereof although under the assumed conditions no rotation is imparted thereto. It will now be seen that the driven shaft fails to revolve whenever the load on it is greater than the combined couples mentioned. Between these two extremes there is a practically infinite number of driving conditions involving an infinite number of gear ratios between the driving and the driven shaft. It will be seen that the faster the spider 36 revolves, the greater the centrifugal force generated, and therefore the greater the couples and resulting torque upon the hollow cylindrical member 78.

This transmission is particularly adapted for use in connection with power generating means that must operate at a substantial number of revolutions per minute to generate power effectively, such as in internal combustion engines, induction electric motors, synchronous motors and the like. At the moment of clutch engagement there is no load but inertia, since there has theretofore been no centrifugal force acting upon the shoes 88. The moment rotation of the shoes commences, however, the centrifugal force develops a load upon the transmission. This centrifugal force increases substantially proportional to the square of the annular velocity of the shoes. The friction between the shoes and the drum 86 is substantially proportional to the centrifugal force because friction is generally independent of velocity once starting friction is overcome.

The transmission described automatically adjusts itself, between the limiting conditions already mentioned, in accordance with a function of driving shaft revolutions and torque load. Thus with a constant engine speed an automobile equipped with this transmission will automatically establish what is commonly referred to as a lower gear ratio between engine and propeller shaft whenever a torque load great enough to destroy the direct drive condition is encountered, such as when the automobile is on a steep hill, and once the shoes 88 start to slip the transmission automatically adjusts itself by lowering the gear ratio as the torque load increases and vice versa. Furthermore, it should be noted that as the engine speed is decreased due to greater torque load (if the operator of the vehicle either does not or cannot increase the power by opening the throttle wider) the centrifugal force of the shoes 88 is diminished and when the limiting point already mentioned is reached, the transmission adjusts itself as heretofore explained. It will now be observed that it will be difficult to stall a motor operating a vehicle equipped with this transmission, because the brake shoe friction decreases as the square of the retarded speed whereas the power output decreases substantially directly in proportion to the retardation or deceleration of the vehicle.

It is noted that the two frictional parts of this transmission, viz. the clutch members 20, 25 and 27 on the one hand, and the shoes 88 and drum portion 86 on the other hand, are contained in dry casings constituting the clutch box 15 and the rear part of the hollow cylindrical member 78 respectively. The rest of the transmission mechanism may be suitably oiled or flooded with oil or simply packed in grease and can therefore operate efficiently. For taking the thrust exerted by the pedal 51 when the transmission is in reverse, I provide a thrust bearing 93, which will receive sufficient lubrication through the journal 23, or other means of providing limited lubrication to this thrust bearing may be incorporated. This thrust bearing 93 is under a load only when the transmission is in reverse.

It will be noted that in the embodiment of Figures 1 and 2 undesirable friction is everywhere eliminated by ball or roller bearings and that the entire construction is extremely rigid and durable and furthermore there is practically nothing to get out of order owing to the simplicity of the unit. If desired the short shaft 75 may be extended into the shaft 26 or journaled in a suitable bearing attached to the spider 36 in order to hold the hollow cylindrical member 78 more rigidly in axial alignment, but this feature may be omitted in connection with transmissions indicated for a relatively light load.

It will thus be seen that there has been provided by this invention an apparatus in which the various objects hereinabove set forth, together with many thoroughly practical advantages, are successfully achieved.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:

1. In a transmission mechanism, in combination, a drive shaft, a spider secured to said drive shaft and carrying a plurality of planetary pinions, an intermediate shaft, a sun gear secured to said intermediate shaft and meshing with said planetary pinions, a driven shaft, a drum member secured to said driven shaft and adapted to rotate therewith, said drum member being rotatably mounted upon said intermediate shaft and having teeth formed on a portion thereof meshing with said planetary pinions, a bracket member secured to said intermediate shaft and spaced from said sun gear, and a plurality of shoes pivoted on said bracket member about axes substantially at right angles to the axis of said intermediate shaft and adapted to swing outwardly under the impetus of centrifugal force to engage said drum member whereby an infinite number of gear ratios between said drive shaft and said driven shaft is achieved.

2. In a transmission mechanism, in combination, a drive shaft, a spider secured to said drive shaft and carrying a plurality of planetary pinions, an intermediate shaft, a sun gear secured to said intermediate shaft and meshing with said planetary pinions, a driven shaft, a drum member secured to said driven shaft and adapted to rotate therewith, said drum member being rotatably mounted upon said intermediate shaft and having teeth formed on a portion thereof meshing with said planetary pinions, a bracket member secured to said intermediate shaft and spaced from said sun gear, and a plurality of shoes pivoted on said bracket member and adapted to swing outwardly under the impetus of centrifugal force to engage said drum member whereby an infinite number of gear ratios between said drive shaft and said driven shaft is achieved.

3. In a transmission mechanism, in combination, a drive shaft, a spider secured to said drive shaft and carrying a plurality of planetary pinions, an intermediate shaft, a sun gear secured to said intermediate shaft and meshing with said planetary pinions, a driven shaft, a drum member secured to said driven shaft and adapted to rotate therewith, said drum member being rotatably mounted upon said intermediate shaft and having teeth formed on a portion thereof meshing with said planetary pinions, a bracket member secured to said intermediate shaft and spaced from said sun gear, and a plurality of shoes pivoted on said bracket member and adapted to swing outwardly to engage said drum member whereby an infinite number of gear ratios between said drive shaft and said driven shaft is achieved.

4. In a transmission mechanism, in combination, a drive shaft, a spider secured to said drive shaft and carrying a plurality of planetary rotatable members, an intermediate shaft, a circular member secured to said intermediate shaft and shaped to form a driving connection with said rotatable members, a driven shaft, a drum member secured to said driven shaft and adapted to rotate therewith, said drum member being rotatably mounted upon said intermediate shaft and shaped to form a driving connection with said planetary rotatable members, a bracket member secured to said intermediate shaft and spaced from said circular member, and a plurality of shoes pivoted on said bracket member and adapted to swing outwardly under the impetus of centrifugal force to engage said drum member whereby an infinite number of gear ratios between said drive shaft and said driven shaft is achieved.

5. In a transmission mechanism, in combination, a drive shaft, a spider secured to said drive shaft and carrying a plurality of planetary rotatable members, an intermediate shaft, a circular member secured to said intermediate shaft and shaped to form a driving connection with said rotatable members, a driven shaft, a drum member secured to said driven shaft and adapted to rotate therewith, said drum member being rotatably mounted upon said intermediate shaft and shaped to form a driving connection with said planetary rotatable members, a bracket member secured to said intermediate shaft and spaced from said circular member, and a plurality of shoes pivoted on said bracket member and adapted to swing outwardly to engage said drum member whereby an infinite number of gear ratios between said drive shaft and said driven shaft is achieved.

ELBERT L. FRIEDLEIN.